US008006908B2

(12) United States Patent
Bergmann et al.

(10) Patent No.: US 8,006,908 B2
(45) Date of Patent: Aug. 30, 2011

(54) DATA SUPPORT WITH IDENTIFICATIONS WRITTEN THEREON BY MEANS OF A LASER BEAM AND METHOD FOR PRODUCTION THEREOF

(75) Inventors: Matthias Bergmann, Vogtareuth (DE); Günter Endres, München (DE); Georg Kruse, Aschheim (DE)

(73) Assignee: Giesecke & Devrient GmbH, München (DE)

( * ) Notice: Subject to any disclaimer, the term of this patent is extended or adjusted under 35 U.S.C. 154(b) by 1384 days.

(21) Appl. No.: 10/582,125

(22) PCT Filed: Dec. 1, 2004

(86) PCT No.: PCT/EP2004/013634

§ 371 (c)(1), (2), (4) Date: Jun. 7, 2006

(87) PCT Pub. No.: WO2005/058610

PCT Pub. Date: Jun. 30, 2005

(65) Prior Publication Data

US 2007/0063053 A1 Mar. 22, 2007

(30) Foreign Application Priority Data

Dec. 12, 2003 (DE) ................................ 103 58 784

(51) Int. Cl.
*G06K 19/00* (2006.01)
*B42D 15/00* (2006.01)

(52) U.S. Cl. ........................................ 235/487; 283/94

(58) Field of Classification Search .................. 235/487, 235/488; 283/94
See application file for complete search history.

(56) References Cited

U.S. PATENT DOCUMENTS

| | | | | |
|---|---|---|---|---|
| 4,298,217 | A * | 11/1981 | Moraw et al. | 283/108 |
| 4,765,656 | A | 8/1988 | Becker et al. | 283/70 |
| 5,712,731 | A * | 1/1998 | Drinkwater et al. | 359/619 |
| 6,073,854 | A * | 6/2000 | Bravenec et al. | 235/487 |
| 6,817,530 | B2 * | 11/2004 | Labrec et al. | 235/487 |
| 6,853,412 | B2 * | 2/2005 | Stephenson | 349/86 |

FOREIGN PATENT DOCUMENTS

| | | |
|---|---|---|
| CA | 2309960 | 5/1999 |
| DE | 3151407 | 10/1983 |
| DE | 19749789 | 5/1999 |
| EP | 0219012 | 4/1987 |

OTHER PUBLICATIONS

PCT/EP2004013634 IPER dated Aug. 29, 2006.

* cited by examiner

*Primary Examiner* — Jamara A Franklin
(74) *Attorney, Agent, or Firm* — Niky Economy Syrengelas, Esq.; K. David Crockett, Esq.; Crockett & Crockett, PC

(57) ABSTRACT

The invention relates to a data carrier into which, by a laser beam, identifiers (20, 22) are introduced in the form of patterns, letters, numbers and/or images that are visible due to local changes in the optical properties of the data carrier, effected by the laser beam and resulting from material transformations. According to the present invention, the data carrier comprises a laser-sensitive recording layer (26) that is transparent in the visible spectral range and that is provided with a surface relief in the form of a lens grid (28). The identifiers are introduced with the laser beam from different directions through the lens grid (28) into the recording layer (26) and are perceptible when later viewed from those same directions. The data carrier is transparent at least in the area of the introduced identifiers (20, 22).

19 Claims, 1 Drawing Sheet

DATA SUPPORT WITH IDENTIFICATIONS WRITTEN THEREON BY MEANS OF A LASER BEAM AND METHOD FOR PRODUCTION THEREOF

FIELD OF THE INVENTIONS

The invention relates to a data carrier into which, by a laser beam, identifiers are introduced in the form of patterns, letters, numbers and/or images that are visible due to local changes in the optical properties of the data carrier, effected by the laser beam and resulting from material transformations.

BACKGROUND OF THE INVENTIONS

Data carriers, such as identification cards, credit cards, bank cards and the like, are increasingly being used in different service sectors, as well as within companies. Normally, they must fulfill two opposing conditions. On one hand, due to their wide circulation, they constitute a mass-produced product that should be easy and economical to manufacture. On the other hand, due to their function in proving identity, they should offer the greatest possible security against counterfeiting or forgery. The multitude of kinds of identification cards available bears witness to the numerous efforts and the diverse proposals on how these opposing requirements can be suitably combined.

From German patent specification DE 31 51 407 C1, for example, a multilayer identification card is known that is furnished with a plastic foil as a recording medium. The plastic foil appears completely transparent in the visible wavelength range, but absorbs so strongly at the wavelength of an infrared laser used for inscribing information that a local blackening of the foil results from the effect of the laser beam. In this way, images and/or data can be inscribed in the plastic foil with good resolution.

Even if the identification card in DE 31 51 407 C1 offers a high degree of counterfeit security, there exists a need to expand the visual design options of such cards and to further impede the forgery or counterfeiting of the cards by introducing new or additional security features.

In this regard, it has been known for some time to provide identification cards with holographic or hologram-like diffraction patterns. Through such structures, the cards are furnished with optically variable effects and simultaneously provided with effective protection against photographic or xerographic reproduction. Due to the high manufacturing costs of holographic structures, they can be manufactured at an economically justifiable cost only when large lots are used. This normally requires that the information content of the holograms not differ from each other. For manufacturing, the information is usually embossed in a plastic foil with an embossing stamp. The plastic foil is provided with a reflecting layer and the surface is sealed with a protective layer. In manufacturing cards, the finished hologram is affixed to the card surface. For the above-cited reasons, the holograms are usually not provided with information that is coordinated with the respective card, such that it is possible, in principle, to transfer a hologram from an authentic card to a fake card.

A further difficulty consists in the fact that visually checking a hologram requires good lighting conditions. The holographic effects are often perceptible only with difficulty or not at all already under the diffuse room lighting predominant in banks, stores or companies. Metallically reflecting or slightly shimmering surfaces can also be produced with so-called decoration materials, such that, under unfavorable lighting conditions, the structures formed with such decoration materials can be mistaken for authentic holograms by laypersons.

SUMMARY

Based on that, it is the object of the present invention to expand the visual design options of a laser-written data carrier, and in doing so, especially to introduce photographically or xerographically non-reproducible features that can be recognized even in unfavorable lighting conditions.

This object is solved by the data carrier and the manufacturing method having the features of the independent claims. Developments of the present invention are the subject of the dependent claims.

According to the present invention, a generic data carrier comprises a laser-sensitive recording layer that is transparent in the visible spectral range and that is provided with a surface relief in the form of a lens grid. Said identifiers are introduced with the laser beam from different directions through the lens grid into the recording layer and are perceptible when viewed from those same directions. The data carrier is transparent at least in the area of the introduced identifiers. Through this combination of features, an optically appealing design of the data carrier is combined with high counterfeit security.

The identifiers are introduced through the lens grid into the underlying recording layer. In doing so, the laser beam is maintained at different, predetermined angles to the plane of the lens grid such that, when the laser radiation passes through the lenses, different patches of the recording layer are modified, normally blackened. The identifiers introduced in this way are each substantially perceptible only from the angle at which they were introduced. The size of the angle range in which an identifier is visible depends on the size of the modified area and can be adjusted, for example, via the pulse energy of the laser beam. In this way, the data carrier can be provided with two or more different identifiers that cannot be photographically or xerographically reproduced, since the entire inscribed information is never perceptible at a certain viewing angle.

Since the data carrier is transparent at least in the area of the introduced identifiers, the identifiers that are visible due to the local changes in the optical properties of the data carrier are, if appropriate, additionally or exclusively perceptible in transmitted light, that is, independent of whether it is viewed from the front or back or only when viewed from one side. Alternatively to a blackening or other discoloration of the recording layer, the laser beam can, for example, also effect a local change in the refractive index or a change in the polarization direction of the transparent recording layer, such that the inscribed identifier is practically invisible in impinging light, that is, when viewed from the front (lens) side. In this way, there can be introduced into data carriers optically appealing authenticating features that, together with the preferably specific information content, lend them a high degree of counterfeit security.

In an advantageous embodiment of the present invention, the lens grid comprises cylindrical lenses and/or spherical lenses. Depending on the concrete application, the axis of said cylindrical lenses can run straight or wavily, parallel or at a certain angle to the outer edge of the data carrier.

The recording layer can be part of a transparent main body of the data carrier or, alternatively, be formed by a separate layer. In the latter case, according to a development of the present invention, the recording layer is formed by a non-self-supporting layer of a thickness particularly preferably of about 1 μm to about 50 μm, for example a plastic foil, made of polycarbonate or polyester, that is doped at least in sub-areas. To protect the inscribed information and to increase the counterfeit security, the recording layer is preferably disposed in the interior of the data carrier. The thickness of the layer depends, among other things, on the material, the lens geometry and the kind of application, and varies preferably between 1 and 800 μm. The layer can consist of PVC, PC, polyester and compounds thereof.

The identifiers can comprise personal data, such as a signature, a birth date, a portrait or the like, as well as, or additionally, data relating to the data carrier, such as a validity period, a card number, information about the issuing authority or institute or the like. Screened identifiers are particularly suited for the laser inscription, the grid elements preferably being formed by rod-shaped pixels. The individual grid elements can then be produced in a controlled manner by pulsed irradiation of the recording layer, for example with a Nd:YAG laser, a Nd:glass laser or also a longer-wave $CO_2$ laser.

The identifiers that are perceptible from different directions are present in the recording layer, expediently nested within each other. The separation of the information content occurs when the data carrier is viewed from the viewing directions that correspond to the recording directions, since the lens grid shows the viewer in each case only the portion of the identifiers associated with the viewing direction. This makes a reproduction of the inscribed information with printing technology practically impossible, since a precise alignment with a lens grid applied later will not be accomplished with the required precision.

In an expedient embodiment, the recording layer and the lens grid are disposed in or on a transparent main body of the data carrier. In addition to the laser-written identifiers described so far, the data carrier can, of course, exhibit further black-and-white or colored impressions and/or further laser inscriptions. The data carrier can also be provided with one or more further security features, especially luminescent, magnetic or electrical substances, or optically variable structures, such as holographic structures.

In a further embodiment, the transparent recording layer is integrated in the main body as an implant or part of a transparent implant. In this case, it is expedient to physically connect the implant with the main body. This is possible, for example, through a lens grid that is larger than the transparent implant and at least partially overlaps the implant and the main body. Furthermore, this is possible if the implant and the main body each exhibit a recording layer that, for example, adjoin one another, such that implant and card body are inseparably joined with one and the same personalization, for example an image.

In a further embodiment, a banknote is involved that, on one hand, is furnished with the inventive recording layer having a lens grid and, on the other hand, exhibits a certain print image. The recording layer having a lens grid and the print image are disposed on the banknote in such a way that they can be folded over one another and the marks inscribed in the recording layer complement the print image to form an entire piece of information.

The data carrier preferably constitutes a value document, such as a banknote, an identification card or the like. In other, likewise advantageous embodiments, the data carrier preferably constitutes a security element for application to a value document, such as a banknote, an identification card or the like.

The present invention also includes a value document, such as a banknote, identification card or the like, having a value document substrate having a window area or hole that is covered on one side or on both sides with a security element of the kind cited. Since, according to the present invention, the security element is transparent, the inscribed identifiers can be read through the window area or the hole of the security paper in transmitted light.

In manufacturing a data carrier of the kind described, first, the laser-sensitive recording layer that is transparent in the visible spectral range is provided with the surface relief in the form of a lens grid, and subsequently, in a transparent area of the data carrier, the identifiers are introduced with the laser beam from different directions through the lens grid into the recording layer, such that the identifiers are perceptible when the data carrier is later viewed from those same directions.

Said identifiers are preferably introduced in a screening method, the grid elements preferably being formed by rod-shaped pixels. Pulsed laser radiation is particularly well suited for producing such grid elements.

Further exemplary embodiments and advantages of the present invention are explained below by reference to the drawings, in which a depiction to scale and proportion was omitted in order to improve their clarity.

BRIEF DESCRIPTION OF THE DRAWINGS

Shown are.

DETAILED DESCRIPTION OF THE INVENTIONS

Figure 1:
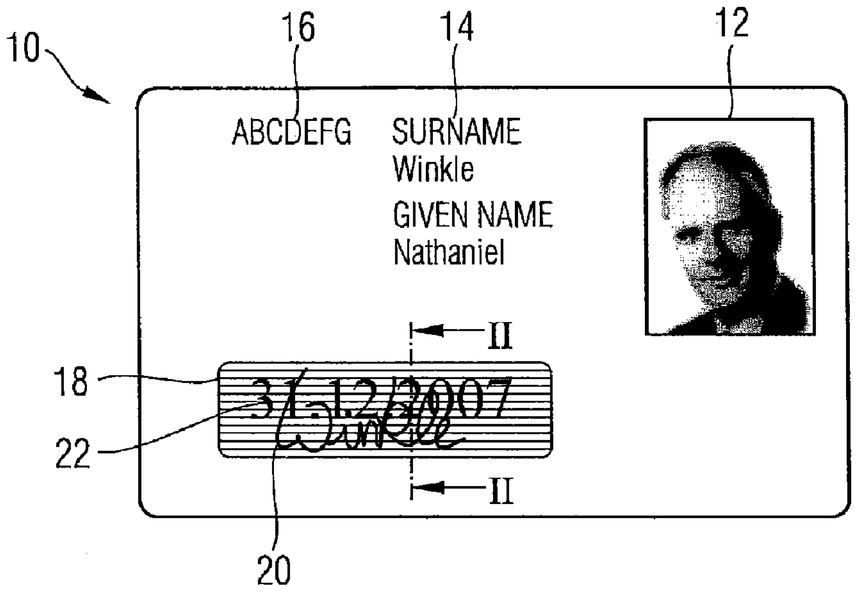
FIG. 1 a top view of a transparent identification card according to an exemplary embodiment of the present invention, diagrammed schematically, FIG. 2 a sectional view of the identification card in FIG. 1 along the line II-II, and FIG. 3 a section through a banknote having a punched opening that is covered with a security element according to an exemplary embodiment of the present invention.

FIG. 1 shows a top view of a transparent identification card 10 according to the present invention, diagrammed schematically. The identification card 10 includes a portrait 12 of the cardholder, as well as further personal data 14, in the exemplary embodiment the first and last name of the holder. Furthermore, the identification card can include further data 16, such as birth date, nationality, issuing authority, issue date and the like.

In a sub-area 18 of the identification card 10 is disposed a laser-tilt image that includes two different pieces of information inscribed by means of a laser beam, in the exemplary embodiment the signature of the holder 20 and the expiration date of the card 22. Unlike in the graphic illustration in FIG. 1, when the identification card 10 is viewed, the two pieces of information 20 and 22 are perceptible, not simultaneously, but rather only by tilting the card 10 at a different tilt angle for each.

Figure 2:
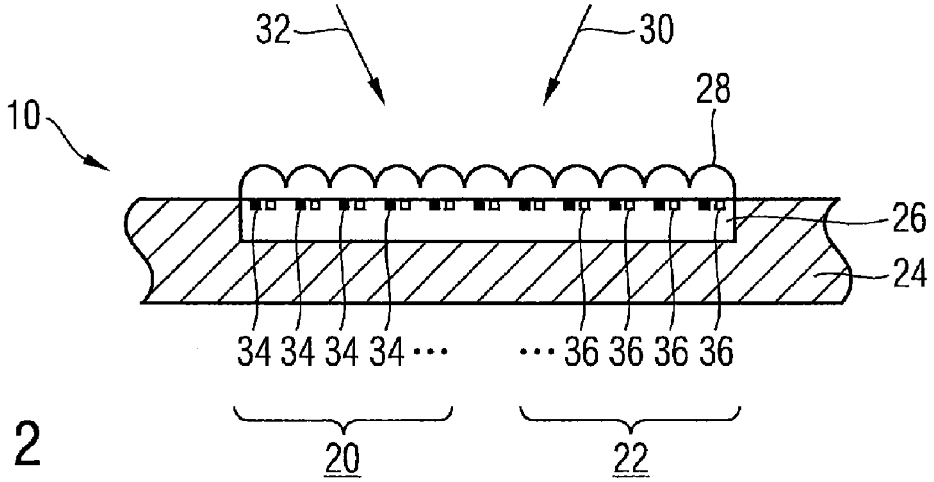

The principle structure of the laser-tilt image 18 will now be explained in greater detail with reference to FIG. 2, which shows a section through the identification card 10 along the line II-II in FIG. 1. The identification card 10 includes a transparent card body 24 and a laser-sensitive recording layer 26 that is likewise transparent in the visible spectral range. The recording layer 26 can be a sub-area of the card body 24 or a separate layer. The recording layer 26 is provided with a surface relief in the form of a lens grid 28 that, in the exemplary embodiment, consists of a plurality of parallel cylindrical lenses.

The personal pieces of information 20 and 22 introduced into the laser-tilt image are inscribed in the recording layer 26 only after the lens grid 28 is applied by means of a pulsed infrared laser. To do this, the laser beam is directed at the lens grid 28 from different directions 30 and 32. Here, depending on the irradiation direction, the individual cylindrical lenses focus the laser beam on different small sub-areas 34 and 36 of the recording layer.

Due to the effect of the laser radiation, the optical properties of the recording layer 26 are altered locally, for example the layer is blackened locally. When the identification card 10 is later viewed from the direction 30, due to the focusing effect of the cylindrical lenses, precisely the blackened sub-areas 34 are perceptible, which combine to form an image for the viewer, in the exemplary embodiment the inscribed signature 20. Accordingly, from the viewing direction 32, the sub-areas 36 inscribed from this direction are perceptible and combine to form for the viewer an image of the expiration date 22.

It is understood that the identification card 10 can exhibit additional layers, for example one or more protective layers, or functional layers provided with other security elements. Here, merely the transparency of the data carrier 10 must remain preserved in the area of the inscribed identifiers 20, 22. These further layers are not essential for the present invention and are thus neither shown in the drawings nor described in detail.

Figure 3:
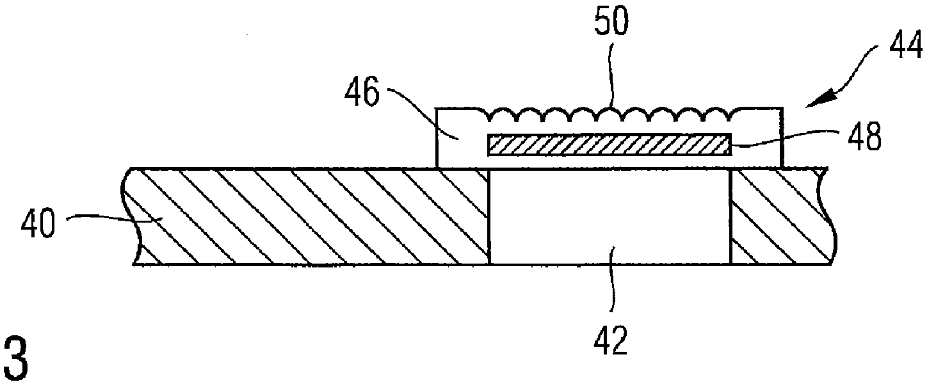

A further exemplary embodiment of the present invention is shown in FIG. 3, which shows a banknote 40 having a through punched opening 42. On the front of the banknote 40, the opening 42 is completely covered with a transparent security element 44 according to the present invention. The security element 44 exhibits a transparent main body 46 and a recording layer 48 that is transparent in the visible spectral range, in which, as described above, pieces of information that include, for example, a serial number of the banknote were inscribed by means of a laser beam.

The recording layer 48 is covered by a lens grid 50 that, in the exemplary embodiment, consists of a plurality of spherical lenses that are embossed in the transparent main body 46. Due to the effect of the laser radiation, the recording layer 48 is blackened at some locations, while the remaining areas of the recording layer 48 are unaltered in transparency. Thus, from the appropriate viewing direction, the inscribed serial number can be read from the back both in reflected light and through the opening 42 of the banknote 40. The tilt effect disappears in a photographic or xerographic reproduction of the banknote.

Instead of the blackening, the laser irradiation can also be used for only a local change of the refractive index or the polarization direction of the recording layer. This further impedes a recreation of the security element 44.

The invention claimed is:

1. A data carrier into which, by a laser beam, identifiers are introduced in the form of patterns, letters, numbers or images that are visible due to local changes in the optical properties of the data carrier, effected by the laser beam and resulting from material transformations, characterized in that:

the data carrier comprises a laser-sensitive recording layer that is transparent in the visible spectral range and that is provided with a surface relief in the form of a lens grid, such that the identifiers are introduced with the laser beam from different directions through the lens grid into the recording layer and are perceptible when viewed from the same directions, and in that the data carrier is transparent at least in the area of the introduced identifiers.

2. The data carrier according to claim 1, characterized in that the changes in the optical properties of the data carrier are visible in transmitted light.

3. The data carrier according to claim 1, characterized in that the changes in the optical properties of the data carrier are visible in reflected light.

4. The data carrier according to claim 1, characterized in that the lens grid comprises cylindrical lenses or spherical lenses.

5. The data carrier according to claim 1, characterized in that the recording layer is formed by a non-self-supporting layer of a thickness of about 1 μm to about 800 μm.

6. The data carrier according to claim 1, characterized in that the recording layer is disposed in the interior of the data carrier.

7. The data carrier according to claim 1, characterized in that the identifiers comprise personal data, namely a signature, a birth date, or a portrait.

8. The data carrier according to claim 1, characterized in that the identifiers comprise data relating to the data carrier, namely a validity period, a card number, or information about the issuing authority or institute.

9. The data carrier according to claim 1, characterized in that the identifiers are present in screened form, the grid elements preferably being formed by rod-shaped pixels.

10. The data carrier according to claim 1, characterized in that the identifiers that are perceptible from different directions are present nested within each other in the recording layer.

11. The data carrier according to claim 1, characterized in that the data carrier exhibits an at least partially transparent main body, in or on which the recording layer and the lens grid are disposed.

12. The data carrier according to claim 1, characterized in that the data carrier exhibits, in addition to the identifiers, black-and-white or colored impressions or further laser inscriptions.

13. The data carrier according to claim 1, characterized in that the data carrier is provided with one or more further security features.

14. The data carrier according to claim 1, characterized in that the data carrier constitutes a value document.

15. The data carrier according to claim 1, characterized in that the data carrier constitutes a security element for application to a value document.

16. A value document having a value document substrate having a window area or hole that is covered on one side or on both sides with a security element according to claim 15.

17. A method for manufacturing a data carrier comprising the steps of:

securing a laser-sensitive recording layer to the data carrier, said laser sensitive recording layer being transparent in the visible spectral range and providing said laser sensitive recording layer with a surface relief in the form of a lens grid, and subsequently, in a transparent area of the data carrier, introducing a plurality of identifiers with a laser beam directed into the recording layer through the lens grid, wherein each said identifier is introduced from a direction different from at least one other identifier, such that the identifiers are perceptible when the data carrier is later viewed from the same direction from which the identifiers were introduced.

18. The method according to claim 17, characterized in that the identifiers are introduced in a screening method, and the grid elements are formed by rod-shaped pixels.

19. The method according to claim 18, characterized in that the grid elements are produced by irradiating the lens grid with laser pulses.

* * * * *